United States Patent
Hagiwara et al.

(10) Patent No.: US 10,490,822 B2
(45) Date of Patent: Nov. 26, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hideki Hagiwara, Nagoya (JP); Masaki Kato, Toyota (JP); Akira Saito, Toyota (JP); Koji Takahata, Nisshin (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 10 days.

(21) Appl. No.: 16/004,588

(22) Filed: Jun. 11, 2018

(65) Prior Publication Data

US 2018/0375102 A1 Dec. 27, 2018

(30) Foreign Application Priority Data

Jun. 22, 2017 (JP) ................. 2017-121794

(51) Int. Cl.
| | |
|---|---|
| *H01M 4/02* | (2006.01) |
| *H01M 4/62* | (2006.01) |
| *H01M 4/13* | (2010.01) |
| *H01M 10/42* | (2006.01) |
| *H01M 10/654* | (2014.01) |
| *H01M 10/0525* | (2010.01) |
| *H01M 4/131* | (2010.01) |

(52) U.S. Cl.
CPC ............. *H01M 4/628* (2013.01); *H01M 4/13* (2013.01); *H01M 4/62* (2013.01); *H01M 10/4235* (2013.01); *H01M 10/654* (2015.04); *H01M 4/131* (2013.01); *H01M 10/0525* (2013.01); *H01M 2004/028* (2013.01); *H01M 2220/20* (2013.01)

(58) Field of Classification Search
CPC ...................................................... H01M 4/02
See application file for complete search history.

(56) References Cited

U.S. PATENT DOCUMENTS

2016/0293936 A1 10/2016 Takebayashi
2017/0141400 A1* 5/2017 Tsukamoto .............. H01B 1/24

FOREIGN PATENT DOCUMENTS

| JP | 2015-103332 A | 6/2015 |
| JP | 201798240 A | 6/2017 |
| JP | 201798241 A | 6/2017 |

* cited by examiner

*Primary Examiner* — Jacob B Marks
(74) *Attorney, Agent, or Firm* — Sughrue Mion, PLLC

(57) ABSTRACT

Provided is a nonaqueous electrolyte secondary battery in which $Li_3PO_4$ is added to a positive electrode active material layer and the increase of battery temperature when the voltage rises is suppressed. The nonaqueous electrolyte secondary battery disclosed herein includes a positive electrode, a negative electrode, and a nonaqueous electrolytic solution. The positive electrode has a positive electrode active material layer. The positive electrode active material layer includes a positive electrode active material, $Li_3PO_4$, and a polymerizable unsaturated monomer including a naphthyl group optionally having a substituent. The content of $Li_3PO_4$ in the positive electrode active material layer is 1% by mass or more and 15% by mass or less. The content of the polymerizable unsaturated monomer including a naphthyl group optionally having a substituent in the positive electrode active material layer is 0.01% by mass or more and 0.1% by mass or less.

1 Claim, 2 Drawing Sheets

NONAQUEOUS ELECTROLYTE SECONDARY BATTERY

BACKGROUND OF THE INVENTION

1. Field of the Invention

The present teaching relates to a nonaqueous electrolyte secondary battery. The present application claims priority based on Japanese Patent Application No. 2017-121794 filed on Jun. 22, 2017, the entire contents of which are hereby incorporated by reference.

2. Description of the Related Art

In recent years, nonaqueous electrolyte secondary batteries such as lithium ion secondary batteries have been advantageously used as portable power sources for personal computers, mobile terminals and the like, and drive power sources for vehicles such as electric vehicles (EV), hybrid vehicles (HV), and plug-in hybrid vehicles (PHV).

It is well known that characteristics of a nonaqueous electrolyte secondary battery deteriorate due to decomposition of a nonaqueous electrolytic solution. For this reason, various techniques for suppressing the deterioration of characteristics caused by the decomposition of the nonaqueous electrolytic solution have been developed. For example, Japanese Patent Application Publication No. 2015-103332 discloses the addition of $Li_3PO_4$ to a positive electrode active material layer. Japanese Patent Application Publication No. 2015-103332 indicates that $Li_3PO_4$ traps an acid generated by decomposition of a nonaqueous electrolytic solution, thereby preventing elution of a transition metal from the positive electrode active material, which makes it possible to suppress deterioration of battery characteristics. In addition, Japanese Patent Application Publication No. 2015-103332 indicates that a coating film derived from $Li_3PO_4$ is formed on the surface of the positive electrode at the time of initial charging, and that this coating film suppresses decomposition of a nonaqueous electrolytic solution, thereby making it possible to suppress the deterioration of characteristics.

SUMMARY OF THE INVENTION

Meanwhile, it is desirable to suppress the rise in temperature in a nonaqueous electrolyte secondary battery when the voltage rises. As a result of intensive research by the inventors of the present teaching, it has been found that there is room for improvement in terms of suppressing the increase of battery temperature when the voltage rises in a conventional nonaqueous electrolyte secondary battery in which $Li_3PO_4$ is added to a positive electrode active material layer.

Accordingly, it is an object of the present teaching to provide a nonaqueous electrolyte secondary battery in which $Li_3PO_4$ is added to a positive electrode active material layer and the increase of battery temperature when the voltage rises is suppressed.

The nonaqueous electrolyte secondary battery disclosed herein includes a positive electrode, a negative electrode, and a nonaqueous electrolytic solution. The positive electrode has a positive electrode active material layer. The positive electrode active material layer includes a positive electrode active material, $Li_3PO_4$, and a polymerizable unsaturated monomer including a naphthyl group optionally having a substituent. The content of $Li_3PO_4$ in the positive electrode active material layer is 1% by mass or more and 15% by mass or less. The content of the polymerizable unsaturated monomer including a naphthyl group optionally having a substituent in the positive electrode active material layer is 0.01% by mass or more and 0.1% by mass or less.

With such a configuration, it is considered that since specific amounts of the polymerizable unsaturated monomer including a naphthyl group optionally having a substituent and $Li_3PO_4$ are present in the nonaqueous electrolyte secondary battery, a modified coating film is formed on one or both of the positive electrode active material and the negative electrode active material. It is also considered that when the voltage rises, the occurrence of an exothermic reaction for example, the decomposition reaction of the nonaqueous electrolytic solution, and the like) is suppressed by the coating film, but the details are unclear. Thus, because of such a configuration, it is possible to provide a nonaqueous electrolyte secondary battery in which $Li_3PO_4$ is added to a positive electrode active material layer and the increase of battery temperature when the voltage rises is suppressed.

DESCRIPTION OF THE PREFERRED EMBODIMENTS

Figure 1:
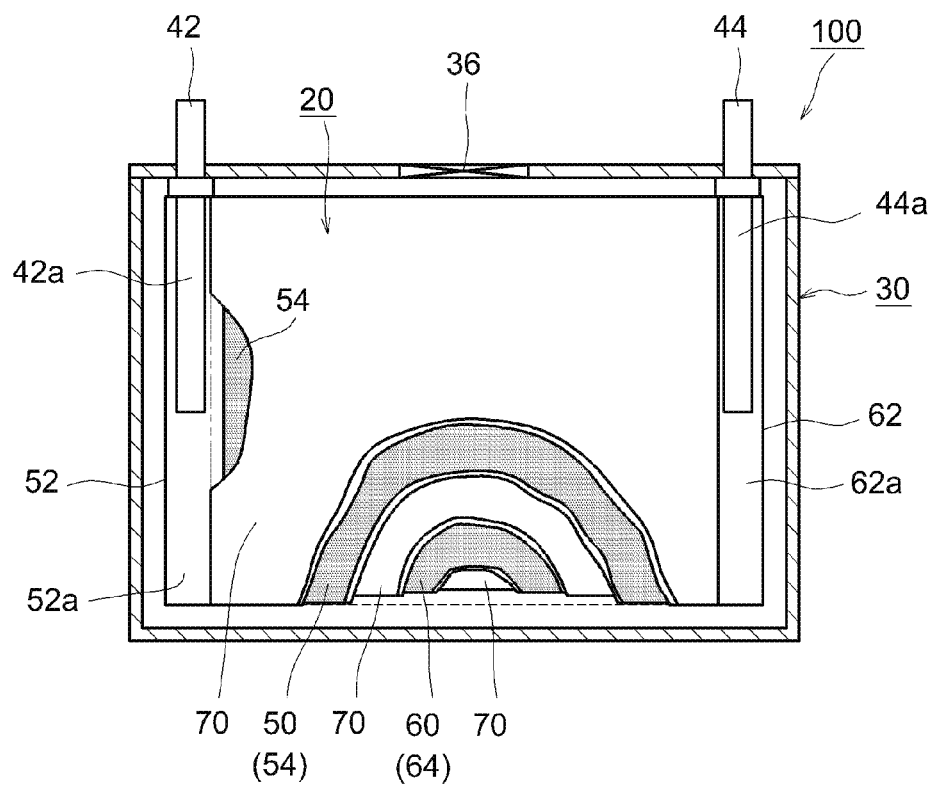
FIG. 1 is a cross-sectional view schematically showing the internal structure of a lithium ion secondary battery according to one embodiment of the present teaching.

Embodiments of the present teaching will be described below with reference to the drawings. Incidentally, the matters other than those specifically mentioned in the present specification, but still necessary for the implementation of the present teaching (for example, the general configuration and production process of a nonaqueous electrolyte secondary battery which do not characterize the present teaching) can be understood as design matters for a person skilled in the art, those design matters being based on the related art in the pertinent field. The present teaching can be carried out based on the contents disclosed in this specification and technical common sense in the field. In addition, in the following drawings, the same reference numerals are attached to members and parts that exhibit the same action. Further, the dimensional relationship (length, width, thickness, and the like) in each drawing does not reflect the actual dimensional relationship.

In this specification, the term "secondary battery" generally refers to a power storage device that can be repeatedly charged and discharged, and is a term encompassing a power storage element such as a so-called storage battery and an electric double layer capacitor.

"Nonaqueous electrolyte secondary battery" refers to a battery including a nonaqueous electrolytic solution (typically, a nonaqueous electrolytic solution including a supporting electrolyte in a nonaqueous solvent).

Hereinafter, the present teaching will be described in detail by taking a flat angular lithium ion secondary battery having a flat wound electrode body and a flat battery case as an example, but the present teaching is not intended to be limited to the battery described in the embodiment.

A lithium ion secondary battery 100 shown in FIG. 1 is a sealed type lithium ion secondary battery 100 constructed by accommodating a flat wound electrode body 20 and a nonaqueous electrolytic solution (not shown) in a flat angular battery case (that is, an outer case) 30. The battery case 30 is provided with a positive electrode terminal 42 and a negative electrode terminal 44 for external connection, and a thin safety valve 36 set so as to release an internal pressure of the battery case 30 when the internal pressure rises to a predetermined level or higher. In addition, an injection port (not shown) for injecting a nonaqueous electrolytic solution is provided in the battery case 30. The positive electrode terminal 42 is electrically connected to a positive electrode current collecting plate 42a. The negative electrode terminal 44 is electrically connected to a negative electrode current collecting plate 44a. For example, a lightweight metal material having good thermal conductivity such as aluminum can be used as the material of the battery case 30.

Figure 2:
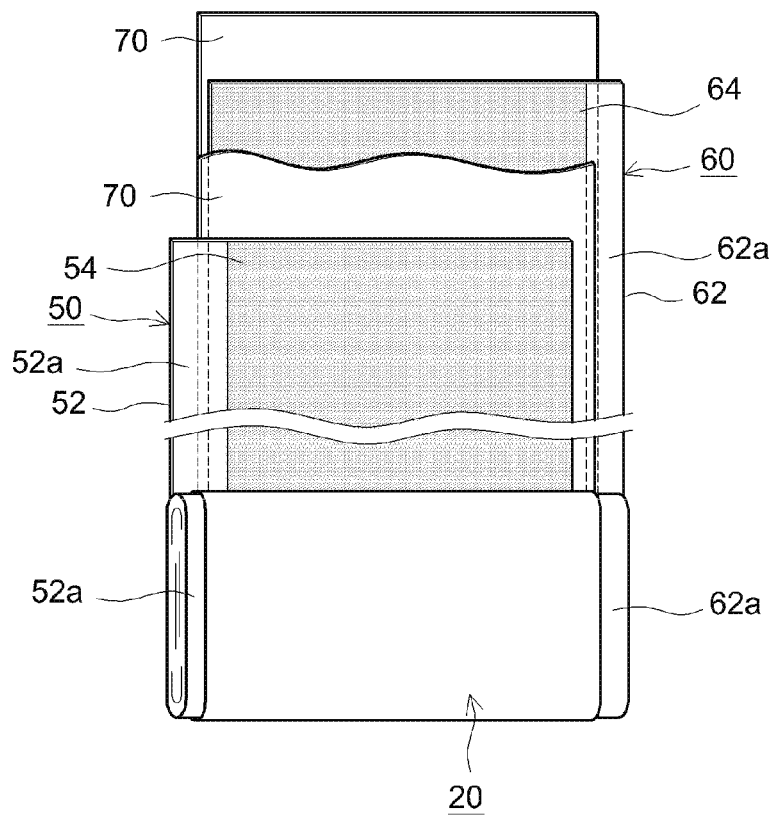
FIG. 2 is a schematic view showing a configuration of a wound electrode body of a lithium ion secondary battery according to one embodiment of the present teaching.

As shown in FIG. 1 and FIG. 2, the wound electrode body 20 has a structure obtained by laminating a positive electrode sheet 50, in which a positive electrode active material layer 54 is formed along the longitudinal direction on one side or both sides (here, both sides) of an elongated positive electrode current collector 52, and a negative electrode sheet 60, in which a negative electrode active material layer 64 is formed along the longitudinal direction on one side or both sides (here, both sides) of an elongated negative electrode current collector 62, with two elongated separator sheets 70 being interposed therebetween, and winding the laminate in the longitudinal direction. The positive electrode current collecting plate 42a and the negative electrode current collecting plate 44a are joined, respectively, to a positive electrode active material layer non-formation portion 52a (that is, a portion where the positive electrode active material layer 54 is not formed and the positive electrode current collector 52 is exposed) and a negative electrode active material layer non-formation portion 62a (that is, a portion where the negative electrode active material layer 64 is not formed and the negative electrode current collector 62 is exposed) which are formed to protrude outward from both ends in the winding axis direction (that is, sheet width direction orthogonal to the longitudinal direction) of the wound electrode body 20.

The positive electrode current collector 52 constituting the positive electrode sheet 50 can be exemplified by an aluminum foil or the like.

The positive electrode active material layer 54 includes a positive electrode active material, $Li_3PO_4$, and a polymerizable unsaturated monomer including a naphthyl group optionally having a substituent (also can be referred to hereinbelow as "naphthyl group-containing monomer").

As the positive electrode active material, a material capable of occluding and releasing lithium ions is used, and one or two or more kinds of substances (for example, oxides having a layered structure and oxides with a spinel structure) conventionally used for lithium ion secondary batteries can be used without any particular limitation. Examples of the positive electrode active material include lithium-containing transition metal oxides such as lithium nickel composite oxides, lithium cobalt composite oxides, lithium manganese composite oxides, lithium nickel manganese composite oxides (for example, $LiNi_{0.5}Mn_{1.5}O_4$), and lithium nickel manganese cobalt composite oxides (for example, $LiNi_{1/3}Mn_{1/3}Co_{1/3}O_2$). The content of the positive electrode active material is desirably 70% by mass or more in the positive electrode active material layer 54 (that is, with respect to the total mass of the positive electrode active material layer 54).

The type of the naphthyl group-containing monomer is not particularly limited as long as it is an unsaturated compound which has a naphthyl group optionally having a substituent and is capable of undergoing a polymerization reaction. The naphthyl group-containing monomer can be exemplified by compounds represented by the following Formula (1),

[Formula 1]

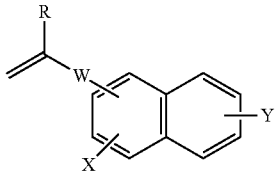

(1)

In Formula (1), R represents a hydrogen atom or a methyl group. X and Y, which may be the same or different, each represent a hydrogen atom, an alkyl group, an alkoxy group, an alkoxycarbonyloxy group, a phenoxycarbonyloxy group, a phosphoryloxy group, a hydroxyl group, a sulfonic acid group, a sulfonamide group, a carboxyl group, an amino group, a nitro group, a halogen atom, an aryloxy group, an alkylthio group, or an arylthio group. W represents: an organic group which may include at least one of an oxygen atom and a nitrogen atom and in which the total number of oxygen atoms, nitrogen atoms and carbon atoms is 1 to 20; or a single bond.

Examples of the compounds represented by Formula (1) include vinylnaphthalene, naphthyl (meth)acrylate, naphthylalkyl (meth)acrylate, and derivatives thereof (that is, derivatives having a substituent on a naphthyl group). These can be used singly or in combination of two or more.

Among the compounds represented by Formula (1), naphthyl (meth)acrylate and derivatives thereof (that is, derivatives having a substituent on a naphthyl group) are desirable. Specifically, compounds represented by the following Formula (2) are desirable.

[Formula 2]

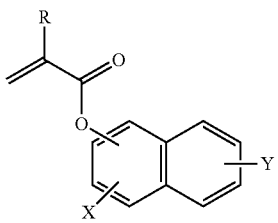

(2)

In Formula (2), R represents a hydrogen atom or a methyl group. X and Y, which may be the same or different, each represent a hydrogen atom, an alkyl group, an alkoxy group, an alkoxycarbonyloxy group, a phenoxycarbonyloxy group, a phosphoryloxy group, a hydroxyl group, a sulfonic acid group, a sulfonamide group, a carboxyl group, an amino group, a nitro group, a halogen atom, an aryloxy group, an alkylthio group, or an arylthio group.

Examples of the compounds represented by Formula (2) include 1-naphthyl (meth)acrylate, 2-naphthyl (meth)acrylate, and derivatives thereof (that is, derivatives having a substituent on a naphthyl group).

Among the compounds represented by Formula (2), 4-substituted-1-naphthyl (meth)acrylate compounds represented by the following Formula (3) are desirable.

[Formula 3]

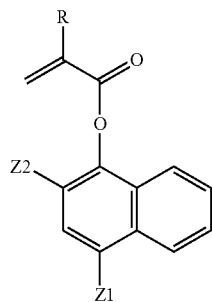

(3)

In Formula (3), R represents a hydrogen atom or a methyl group. Z1 represents a hydroxyl group, a phosphoryloxy group, a phenoxycarbonyloxy group, an alkyl group having 1 to 8 carbon atoms, an alkoxy group having 1 to 8 carbon atoms, or an alkoxycarbonyloxy group having 1 to 8 carbon acorns. When Z1 is an alkyl group or an alkoxy group, the carbon number thereof is desirably 1 to 4, more desirably 1 to 2, and even more desirably 1. When Z1 is an alkoxycarbonyloxy group, the carbon number of the alkoxy moiety is desirably 1 to 4, more desirably 1 to 2, and even more desirably 1. Z2 represents a hydrogen atom, a hydroxyl group, an alkyl group having 1 to 4 carbon atoms, or an alkoxy group having 1 to 4 carbon atoms. When Z2 is an alkyl group or an alkoxy group, the carbon number thereof is desirably 1 to 2, more desirably 1.

Examples of the 4-substituted-1-naphthyl (meth)acrylate compounds represented by Formula (3) include 4-methyl-1-naphthyl (meth)acrylate, 4-ethyl-1-naphthyl (meth)acrylate, 4-methoxy-1-naphthyl (meth)acrylate, 4-ethoxy-1-naphthyl (meth)acrylate, 4-hydroxy-naphthyl (meth)acrylate, 2-methoxy-4-hydroxy-1-naphthyl (meth)acrylate, 2-ethoxy-4-hydroxy-1-naphthyl (meth)acrylate, 2-hydroxy-4-methoxy-1-naphthyl (meth)acrylate, hydroxy-4-ethoxy-1-naphthyl (meth)acrylate, 4-methoxycarbonyloxy-1-naphthyl (meth)acrylate, 4-phenoxycarbonyloxy-1-naphthyl (meth)acrylate, and 4-phosphoryloxy-1-naphthyl (meth)acrylate. These can be used singly or in combination of two or more.

The content of $Li_3PO_4$ is 1% by mass or more and 15% by mass or less in the positive electrode active material layer 54.

The content of the naphthyl group-containing monomer is 0.01% by mass or more and 0.1% by mass or less in the positive electrode active material layer 54.

When the content of $Li_3PO_4$ and the content of the naphthyl group-containing monomer are within the above ranges, it is possible to suppress the increase of battery temperature when the voltage rises.

The investigation conducted by the inventors of the present teaching has confirmed that when a lithium ion secondary battery was actually manufactured, a coating film was formed on the surfaces of both the positive electrode active material and the negative electrode active material. Therefore, it is considered that when the naphthyl group-containing monomer and $Li_3PO_4$ are present in specific amounts in the lithium ion secondary battery, a modified coating film is formed on one or both of the positive electrode active material and the negative electrode active material. Specifically, it is considered that a coating film different from the conventional one is formed on one or both of the positive electrode active material and the negative electrode active material as a result of a reaction of the naphthyl group-containing monomer and a reaction product of $Li_3PO_4$ and an acid (for example, HO generated by decomposition of the nonaqueous electrolytic solution. It is also considered that this coating film suppresses the occurrence of an exothermic reaction (for example, the decomposition reaction of the nonaqueous electrolytic solution) when voltage rises.

The content of $Li_3PO_4$ is desirably 2% by mass or more and 15% by mass or less, more desirably 3% by mass or more and 12% by mass or less, and even more desirably 5% by mass or more and 10% by mass or less in the positive electrode active material layer 54 because the increase of battery temperature when the voltage rises can be further suppressed.

The content of the naphthyl group-containing monomer is desirably 0.015% by mass or more and 0.08% by mass or less, and more desirably 0.02% by mass or more and 0.05% by mass or less in the positive electrode active material layer 54 because the increase of battery temperature when the voltage rises can be further suppressed.

The ratio of the content of $Li_3PO_4$ to the content of the naphthyl group-containing monomer in the positive electrode active material layer 54 (the content of $Li_3PO_4$/the content of the naphthyl group-containing monomer) is desirably 10 or more and 1,500 or less, more desirably 20 or more and 1,000 or less, and still more desirably 40 or more and 750 or less because the increase of battery temperature when the voltage rises can be further suppressed.

As a result of using the combination of $Li_3PO_4$ and the naphthyl group-containing monomer, the output of the lithium ion secondary battery 100 at a low temperature (for example, about −30° C.) and a low SOC (for example, a SOC of about 20%) is increased.

The positive electrode active material layer 54 may include components other than the positive electrode active material, $Li_3PO_4$, and the naphthyl group-containing monomer. Examples thereof include a conductive material, a binder, and the like.

As the conductive material, for example, carbon black such as acetylene black (AB) or other carbon materials (for example, graphite or the like) be advantageously used. The content of the conductive material in the positive electrode active material layer 54 is desirably 1% by mass or more and 15% by mass or less, and more desirably 3% by mass or more and 13% by mass or less.

As the binder, for example, polyvinylidene fluoride (PVdF) or the like can be used. The content of the binder in the positive electrode active material layer 54 is desirably 1% by mass or more and 15% by mass or less, and more desirably 2% by mass or more and 10% by mass or less.

The negative electrode current collector 62 constituting the negative electrode sheet 60 can be exemplified by a copper foil or the like. As the negative electrode active material contained in the negative electrode active material layer 64, a carbon material such as graphite, hard carbon, and soft carbon can be used. The graphite may be natural graphite or artificial graphite, and may be amorphous carbon-coated graphite in which graphite is coated with an amorphous carbon material. The negative electrode active material layer 64 may include components other than the active material, such as a binder and a thickener. As the binder, for example, styrene butadiene rubber (SBR) or the like can be used. As the thickener, for example, carboxymethyl cellulose (CMC) or the like can be used.

The content of the negative electrode active material in the negative electrode active material layer is desirably 90% by mass or more, and more desirably from 95% by mass to 99% by mass. The content of the binder in the negative electrode active material layer is desirably from 0.1% by mass to 8% by mass, and more desirably from 0.5% by mass to 3% by mass. The content of the thickener in the negative electrode active material layer is desirably from 0.3% by mass to 3% by mass, and more desirably from 0.5% by mass to 2% by mass.

The separator 70 can be exemplified by a porous sheet (film) made of a resin such as polyethylene (PE), polypropylene (PP), polyester, cellulose, and polyamide. Such a porous sheet may have a single layer structure or a laminate structure of two or more layers (for example, a three-layer structure in which PP layers are laminated on both surfaces of a PE layer). A heat-resistant layer (HRL) may be provided on the surface of the separator 70.

The nonaqueous electrolytic solution typically includes a nonaqueous solvent and a supporting salt.

As the nonaqueous solvent, an organic solvent such as various carbonates, ethers, esters, nitriles, sulfones, and lactones, which are used in electrolytic solutions of general lithium ion secondary batteries, can be used without particular limitation. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. Such nonaqueous solvents can be used singly or in combination of two or more.

As the supporting salt, for example, a lithium salt such as $LiPF_6$, $LiBF_4$, and $LiClO_4$ (desirably $LiPF_6$) can be suitably used. The concentration of the supporting salt is desirably 0.7 mol/L or more and 1.3 mol/L or less.

As long as the effect of the present teaching is not remarkably impaired, the nonaqueous electrolytic solution may include components other than the above-mentioned components, for example, various additives such as: a gas generating agent such as biphenyl (BP) and cyclohexylbenzene (CHB); and a thickener.

The lithium ion secondary battery 100 configured as described above can be used for various purposes. Suitable applications include a drive power source mounted on a vehicle such as an electric vehicle (EV), a hybrid vehicle (RV), and a plug-in hybrid vehicle (PHV). Typically, the lithium ion secondary battery 100 can also be used in the form of a battery pack in which a plurality of lithium ion secondary batteries is connected in series and/or in parallel.

The rectangular lithium ion secondary battery 100 including the flat wound electrode body 20 has been described hereinabove by way of example. However, the nonaqueous electrolyte secondary battery disclosed herein can also be configured as a lithium ion secondary battery including a stacked electrode body. Further, the nonaqueous electrolyte secondary battery disclosed herein can also be configured as a cylindrical lithium ion secondary battery. Furthermore, the nonaqueous electrolyte secondary battery disclosed herein can also be configured as a nonaqueous electrolyte secondary battery other than the lithium ion secondary battery.

Hereinafter, examples relating to the present teaching will be described, but the present teaching is not intended to be limited to the batteries shown in the examples.

Preparation of Lithium Ion Secondary Battery for Evaluation

A paste in which acetylene black (AB) as a conductive material, naphthyl methacrylate as the naphthyl group-containing monomer, and N-methylpyrrolidone (NMP) were mixed was obtained using a disperser. A mixed powder of $LiNi_{1/3}Co_{1/3}Mn_{1/3}O_2$ (LNCM) as a positive electrode active material and $Li_3PO_4$ was added to the paste, and then the solid fraction was uniformly dispersed to prepare a slurry for forming a positive electrode active material layer. The slurries for forming the positive electrode active material were prepared so as to satisfy $LNCM:Li_3PO_4$:naphthyl group-containing monomer:AB:PVdF=90−x−y:x:y:8:2 (mass ratio) (x and y have values shown in Table 1). Each slurry was band-like applied to both sides of an elongated aluminum foil having a thickness of 15 dried, and then pressed to prepare a positive electrode sheet.

Further, natural graphite (C) as a negative electrode active material, styrene butadiene rubber (SBR) as a binder, and carboxymethyl cellulose (CMC) as a thickener were mixed at a mass ratio of C:SBR:CMC=98:1:1 with ion exchanged water to prepare a slurry for forming a negative electrode active material layer. This slurry was band-like applied to both sides of an elongated copper foil having a thickness of 10 μm, dried, and then pressed to prepare a negative electrode sheet.

Two porous polyolefin sheets having a thickness of 20 μm and a three layer structure of PP/PE/PP were prepared as a separator sheet.

The prepared positive electrode sheet and negative electrode sheet and two prepared separator sheets were laminated and wound to prepare a wound electrode body. At this time, the separator was interposed between the positive electrode sheet and the negative electrode sheet. Respective electrode terminals were attached to the positive electrode sheet and the negative electrode sheet, and the electrode body was accommodated in a battery case having an injection port.

Subsequently, a nonaqueous electrolytic solution was injected from the injection port of the battery case, and the injection port was airtightly sealed. The nonaqueous electrolytic solution was prepared by dissolving $LiPF_6$ as a supporting salt at a concentration of 1.0 mol/L in a mixed solvent including ethylene carbonate (EC), dimethyl carbonate (DMC), and ethylinethyl carbonate (EMC) at a volume ratio of 3:4:3.

In this way, a lithium ion secondary battery for evaluation was prepared.

Battery Temperature Measurement

Each of the lithium ion secondary batteries for evaluation prepared above was subjected to initial charge and discharge treatment. Thereafter, a thermocouple was attached to the battery case of each lithium ion secondary battery for evaluation, and the temperature was measured. Each battery was thereafter charged to 5.1 V and the temperature was measured. Then, a temperature difference (that is, a temperature increase amount) before and after charging was obtained. In a series of the lithium ion secondary batteries for evaluation having different contents of $Li_3PO_4$, the temperature increase amount of the lithium ion secondary battery in which the content of the naphthyl group-containing monomer was 0% by mass was taken as a reference (reference value: 100%), and the ratio C/O of temperature increase amount of each lithium ion secondary battery for evaluation was calculated. The results are shown in Table 1.

TABLE 1

| Ratio of battery temperature increase amount during 5.1 V charging | | Content y of naphthyl group-containing monomer (% by mass) | | | | | | | | |
|---|---|---|---|---|---|---|---|---|---|---|
| | | 0 | 0.001 | 0.01 | 0.02 | 0.05 | 0.1 | 0.2 | 0.5 | 1 |
| Content x of $Li_3PO_4$ (% by mass) | 0.1 | 100.0 | 101.2 | 101.8 | 101.7 | 104.1 | 105.2 | 104.2 | 104.1 | 103.5 |
| | 0.2 | 100.0 | 102.1 | 101.3 | 100.5 | 102.2 | 102.9 | 103.5 | 104.2 | 105.2 |
| | 0.5 | 100.0 | 101.5 | 98.5 | 96.7 | 101.3 | 100.9 | 102.7 | 101.5 | 102.4 |
| | 1 | 100.0 | 100.6 | 91.0 | 90.4 | 90.3 | 91.2 | 97.4 | 103.2 | 104.2 |
| | 2 | 100.0 | 98.2 | 88.2 | 86.3 | 86.4 | 89.1 | 96.0 | 102.3 | 101.5 |
| | 5 | 100.0 | 97.4 | 86.2 | 85.3 | 88.4 | 89.3 | 95.1 | 104.1 | 103.5 |
| | 10 | 100.0 | 99.1 | 88.6 | 87.9 | 86.0 | 86.6 | 99.9 | 100.9 | 102.7 |
| | 15 | 100.0 | 97.9 | 90.4 | 86.5 | 90.1 | 85.5 | 97.1 | 101.1 | 102.5 |
| | 30 | 100.0 | 100.9 | 103.5 | 102.6 | 101.4 | 101.2 | 98.2 | 100.5 | 101.5 |
| | 50 | 100.0 | 101.7 | 101.3 | 102.9 | 103.2 | 103.4 | 100.5 | 102.6 | 104.2 |

As shown in Table 1, when the positive electrode active material layer includes 1% by mass or more and 15% by mass or less of $Li_3PO_4$ and 0.01% by mass or more and 0.1% by mass or less of the naphthyl group-containing monomer, the increase of battery temperature when the voltage rises is suppressed to a large extent.

Therefore, it is clear that with the nonaqueous electrolyte secondary battery disclosed herein, the increase of battery temperature when the voltage rises can be suppressed.

Although specific examples of the present teaching have been described in detail above, these are merely illustrative and do not limit the scope of the claims. Techniques set forth in the claims include those in which the concrete examples exemplified above are variously modified and changed.

What is claimed is:

1. A nonaqueous electrolyte secondary battery comprising:

a positive electrode;
a negative electrode; and
a nonaqueous electrolytic solution, wherein
the positive electrode has a positive electrode active material layer,
the positive electrode active material layer includes a positive electrode active material, $Li_3PO_4$, and a polymerizable unsaturated monomer including a naphthyl group optionally having a substituent,
a content of $Li_3PO_4$ in the positive electrode active material layer is 1% by mass or more and 15% by mass or less, and
a content of the polymerizable unsaturated monomer including a naphthyl group optionally having a substituent in the positive electrode active material layer is 0.01% by mass or more and 0.1% by mass or less.

* * * * *